March 23, 1943.　　　O. W. PINEO　　　2,314,800
INFRA-RED SPECTROPHOTOMETER
Filed July 21, 1939　　　2 Sheets-Sheet 1
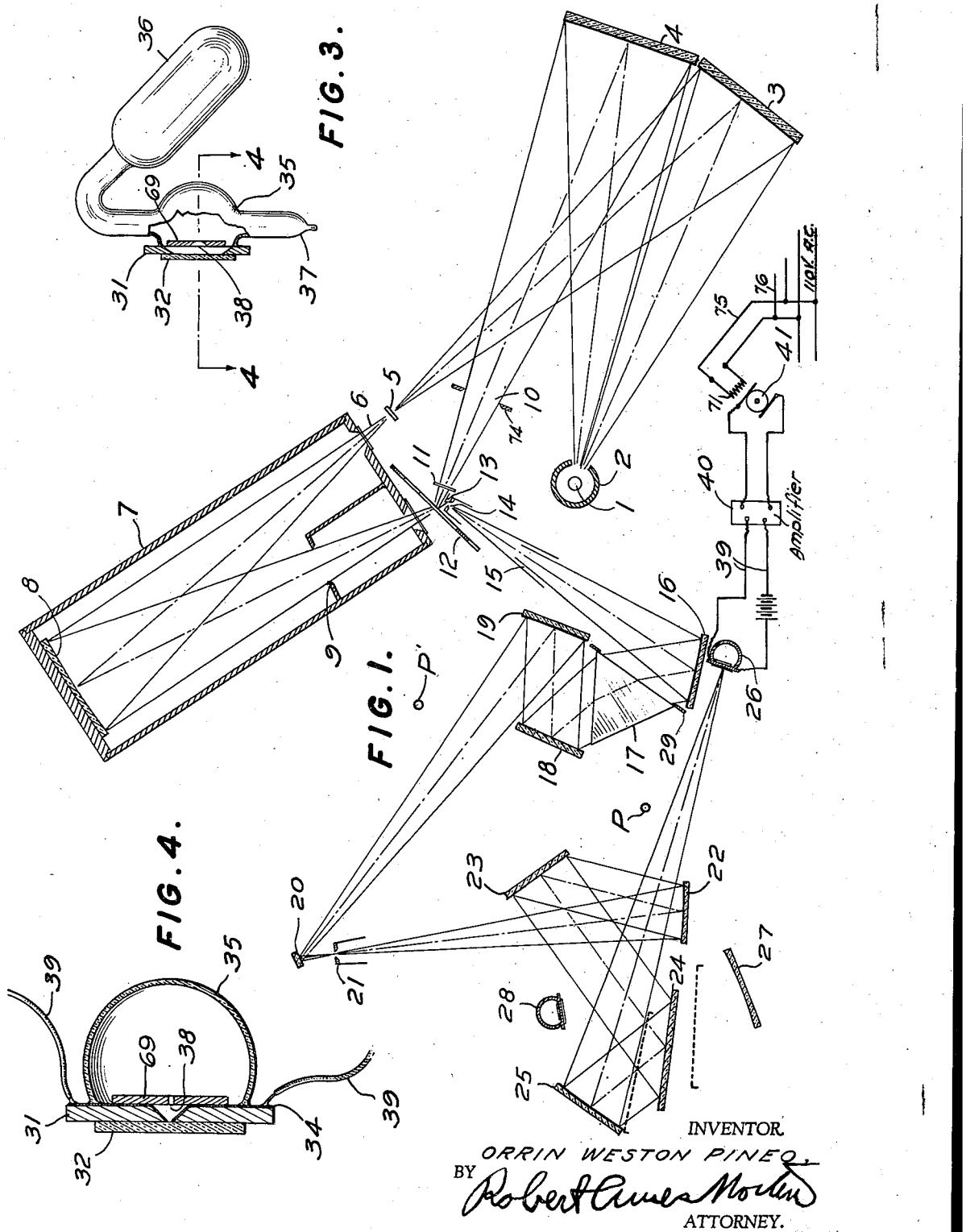
INVENTOR.
ORRIN WESTON PINEO
BY Robert Ames Norton
ATTORNEY.

March 23, 1943.　　　O. W. PINEO　　　2,314,800
INFRA-RED SPECTROPHOTOMETER
Filed July 21, 1939　　　2 Sheets-Sheet 2
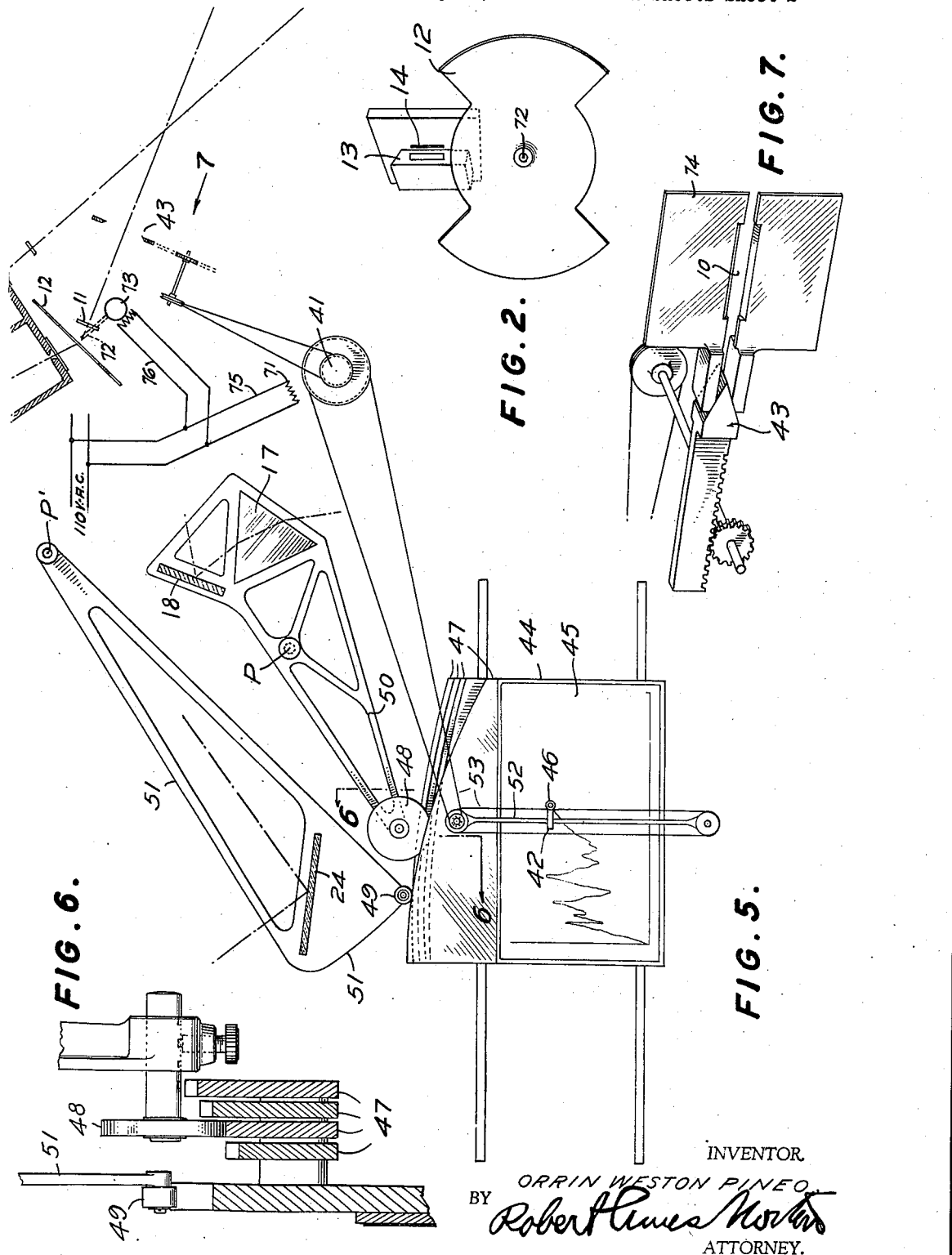
INVENTOR.
ORRIN WESTON PINEO
BY Robert Ames Norton
ATTORNEY.

Patented Mar. 23, 1943

2,314,800

UNITED STATES PATENT OFFICE 2,314,800

INFRARED SPECTROPHOTOMETER

Orrin W. Pineo, Milo, Maine, assignor, by mesne assignments, to American Cyanamid Company, New York, N. Y., a corporation of Maine Application July 21, 1939, Serial No. 285,689

5 Claims. (Cl. 250—43)

This invention relates to recording spectrophotometers of the flickering beam type, and more particularly to recording spectrophotometers for measurement in the infra-red region of the spectrum.

In infra-red spectrophotometry at the present time, measurement is effected by comparing the curve of emission of a suitable source of infrared radiation with a curve which is obtained when the infra-red radiation from the same source is passed through a sample. In order to determine the absorption of the sample, it is necessary to compare the two curves point by point and to calculate out the quotient curve. This is a lengthy procedure and is subject to certain inaccuracies.

The apparatus of the above described method may be analyzed into four components; the source of monochromatic infra-red radiation, the sample whose absorption is to be measured, a thermoelectric receiver which transforms radiation into a direct current of corresponding amount, and a galvanometer or other direct current indicator. The thing to be measured is the variation with wave length of absorption in the sample. Unfortunately, however, the direct current produced by the receiver will also vary with two other factors; namely, variations in intensity of the source and variations in the thermal environment of the receiver. It is almost impossible to keep a source absolutely constant and it is difficult to prevent changes in the thermal environment of the receiver. Therefore, in addition to the variation of source emission with wave length, which even with a perfectly steady source requires comparing wave length by wave length curves of the radiation itself and the same after passing through the sample as described above, there are the further inaccuracies due to unsteady source and changing thermal environment of the receiver.

The above inaccuracies can be avoided according to the present invention by using a flickering beam spectrophotometer in which beams through a sample and a reference standard alternately strike the thermoelectric receiver, the beams increasing and decreasing in opposite phase. In such a case, the thermoelectric receiver does not produce merely a direct current, but when there is any unbalance between the two beams, it produces a superposed alternating current whose frequency is that of the alternation or flickering of the beams, and this alternating current persists as long as there is any unbalance in the two beams. Instead of using a recording device which is sensitive to the direct current and which accordingly responds not only to changes in absorption in the sample but also to changes in intensity of emission of the source and to thermal environment of the receiver, an A. C. amplifier can be used which is sharply tuned to respond only to the alternating current whose vanishing point at balance of the beams is unaffected either by the usual slow changes in the emission of the source or in the thermal environment of the receiver. In other words, the alternating component is affected only by absorption in the sample and standard, and accordingly can be used to give accurate results regardless of fluctuations in the source and in the receiver environment.

Spectrophotometers for measurement in the visible spectrum have been constructed according to the flickering beam principle using normally a photocell as a receiver. These spectrophotometers, such as for example those described in my earlier Patents No. 2,107,836 issued February 8, 1938 and No. 2,126,410 issued August 9, 1938, employ automatic means for varying the relative intensity of the beams to bring about a balance, which automatic means can be used to draw curves or operate other devices.

In infra-red spectrophotometers, particularly those measuring far into the infra-red, the photocell type of radiation receiver cannot be used and other types of thermally actuated receivers are required, such as thermocouples, bolometers, and the like. However, a serious problem is presented in infra-red work due to two factors which make the amount of energy available for measurement in an infra-red spectrophotometer much less than in the visual range spectrophotometer. The first is the necessity of using a relatively low temperature source since no material transparent to infra-red radiation is readily available for enclosing it against oxidation by the atmosphere. The second factor is the higher degree of resolution which is necessary in the infra-red spectrum. In the visual range spectrophotometer, a resolution of 50 is usually ample, allowing the discrimination of two wave lengths differing by one-fiftieth of the mean wave length. In an infra-red spectrophotometer, the required resolution in the so-called rock salt region of 3 to 12 microns may be, for example, 800, and in the so-called quartz region of 0.75 to 3 microns, 2,000. The necessity for high resolution in the infra-red arises from the fact that absorption curves in the infra-red have very narrow absorption peaks as compared with the peaks which are observed in the visible spectrum. In particular, the infra-red absorption of gases exhibits a very fine structure exemplified by the 3.46µ band of hydrochloric acid which shows at 0.025µ intervals a series of doublet lines separated by 0.0025µ. A resolving power of 140 would barely show the larger structure due to rotation of the molecule and a resolving power of 1400 barely shows the doublet structure due to chlorine isotopes of mass 35 and 37. Now the energy transmitted by a monochromator, and available for measurement in a spectrophotometer, decreases as the square of the increase in resolution. There is thus but little energy available in an infra-red spectrophotometer and an extremely efficient transfer of energy into electrical oscillations is necessary for satisfactory operation.

Thermocouples are in general unsuited to vacuum tube amplification. It is not readily feasible to design a thermocouple of high internal resistance and, accordingly, the small energy which it receives in an infra-red spectrophotometer appears more as current than as voltage in its low resistance circuit. Vacuum tube amplifiers require a voltage input signal which is much larger than required by the low resistance galvanometer usually associated with a thermocouple. In other words, the usual low-resistance thermocouple is an inefficient transformer of radiant energy into voltage for vacuum tube amplification. Ordinary bolometers are no better than thermocouples because they also have a low internal resistance of the same order of magnitude, i. e., 30 ohms or the like. A vacuum tube amplifier has an input resistance in the neighborhood of 500 megohms and accordingly is not matched to, and cannot be efficiently driven by, an ordinary bolometer.

I have found that a bolometer to be useful in the flickering beam spectrophotometer of the present invention must conform to four requirements. First, its heat capacity must be sufficiently small so that it can follow radiation variations at flicker frequency which for satisfactory amplification cannot be much below 60 cycles per second. Second, its internal resistance must be high, in the order of several megohms, as has been pointed out above; otherwise, it will not satisfactorily drive into the high impedance input circuit of a thermionic amplifier and accordingly the efficiency of energy transfer will be low. Third, the bolometer must be stable and must not produce excessive noise containing flicker frequency components. This factor requires a bolometer of substantially continuous structure. If high resistance is obtained by using so small an amount of material that the structure is not continuous, the electrical properties are not satisfactory because the bolometer resistance is not stable and excessive noise does result. The fourth requirement is that the bolometer shall show sufficient opacity to absorb efficiently the incident radiant energy.

Ordinary metals, such as gold and platinum which are frequently used in bolometers, have a relatively high conductivity. Hence in order to obtain high resistance, the thickness of the metal has to be reduced to such an extent, for example, by sputtering or evaporating onto a support, that it is no longer continuous and the difficulties involved with a discontinuous structure are encountered as referred to in connection with the third requirement. Such extremely thin bolometers also suffer from insufficient opacity, although the opacity may be increased by a deposit of black material.

Materials of high resistance are therefore required in order to produce a bolometer of continuous structure which has at the same time sufficient resistance to satisfy the second requirement referred to above. Many chemical compounds are known which possess relatively high resistance such as, for example, certain metal sulfides. However, when chemical compounds are used, the high resistance is obtained at the expense of non-uniform conduction which is not purely ohmic and shows polarization and decomposition. I have found that high resistance metallic elements such as tellurium and germanium can be used and bolometers having resistances of the order of several megohms can be readily constructed of these materials. Such bolometers when properly made conform to the four basic requirements set out above.

While the present invention is not limited to any particular method of flickering, I have found that the conditions for flickering are quite different from those which obtain in spectrophotometers operating in the visible spectrum. Polarization flickering is used by almost all visual-range spectrophotometers in practical use, such as those described in my earlier patents referred to above. Mechanical flickering such as disclosed in U. S. Patent No. 1,806,199 is, without further improvement, relatively unsatisfactory in the visual-range spectrophotometer. In the infra-red, however, I have found that an improved method of mechanical flickering is normally preferably to polarization flickering due to the lack of an efficient means for polarization throughout the four octaves of the infra-red in which measurement is ordinarily desired. In the near infra-red, polarizing devices of the ordinary type may be used but a problem is encountered in the far infra-red to obtain materials of the necessary birefringent properties in the form of large crystals which are also transparent to this radiation. While it is possible, therefore, to use polarization flickering in the infra-red and the invention therefore in its broader aspects includes such methods, I prefer mechanical flickering which presents a number of advantages when used in the infra-red spectrophotometer of the present invention provided, however, that the method is improved to avoid certain disadvantages which are otherwise troublesome.

The disadvantages in the usual type of mechanical flickering in which a rotating disc is provided with alternate reflecting and transmitting sectors, arise in diffraction effects along the sector edges. Diffraction reduces the amount of energy by the proportion diffracted out of the beam and therefore produces a spurious signal at double flicker frequency which may mask the vanishing signal at balance. The diffraction effect is even more serious in the infra-red than it is in the visible spectrum, in direct proportion to the wave length, so that from a consideration of the inherent difficulties it would appear at first glance that mechanical flickering would be even less suitable in the infra-red than in the visible spectrum. In a preferred modification of the present invention these difficulties are avoided by using a beam of light striking the flickering disc with an aperture angle in the plane of diffraction considerably greater than the aperture which the monochromator subsequently uses. In this manner, as much light is diffracted into the beam entering the monochromator as is diffracted out, whereby the diffraction effect is substantially eliminated.

The present invention is not limited to any particular design of monochromator. However, I have found that a double monochromator, in which a prism such as a rock salt prism is used for the first dispersion followed by a grating for the second dispersion, gives the best results. In the first place, the grating permits a higher resolving power than can conveniently be obtained with a prism, and gratings of different dispersions can be used for different regions in the infra-red spectrum. In this manner the best compromise between resolution and intensity of the spectrum can be chosen for the particular region of the spectrum in question.

Dispersing prisms in a monochromator show a varying amount of light absorption in different portions of the prism corresponding to different wave lengths because the thickness of the prism varies. Spectrophotometers of the flickering beam type, however, require variation of one of the flickering beams, usually a reference beam, in order to restore balance. In a preferred embodiment of the present invention, this is effected by varying the size of the reference beam in a dimension along the height of the prism rather than in the dimension in the direction of varying prism thickness. Changes in beam size, therefore, do not change the relative amount of absorption due to the prism.

Since lenses are not readily available for the infra-red, focusing is preferably effected by concave mirrors which should be figured as accurately as possible to conserve energy. However, some astigmatism will remain and therefore it is desirable to image the monochromator exit slit onto the bolometer in such a manner that it is substantially longer than the section actually falling onto the bolometer in order that any astigmatism of the mirrors will only affect the illumination at the unused ends of the image.

The invention will be described in greater detail in conjunction with a typical infra-red spectrophotometer shown in the drawings in which Fig. 1 is a diagrammatic horizontal section through the illuminating source, photometer, monochromator, and bolometer, together with a diagrammatic illustration of the amplifying and recording circuit;

Fig. 2 is a detail view of the flickering device and monochromator entrance slit with attached mirror;

Fig. 3 is an elevation of the bolometer;

Fig. 4 is a horizontal section through Fig. 3 along the line 4—4;

Fig. 5 is a semi-diagrammatic illustration of the recording mechanism;

Fig. 6 is a detail view in direction 6 of Fig. 5 showing the monochromator cams; and Fig. 7 is a detail view in direction 7 in Fig. 5 showing the photometering aperture and its actuating mechanism.

In the device shown in Fig. 1 of the drawings, a source of infra-red radiation 1 is enclosed in a suitable chamber 2 which may be water-cooled. Radiation from the source 1 is formed by the concave mirrors 3 and 4 into two beams. One beam passes through a thin liquid sample 5 or a vapor sample contained in the long cell 7 having entrance window 6 and concave reflector 8. The other beam passes through a variable aperture 10 and reference cell 11. A rotating mechanical flickering disc 12 is placed where the beams are brought together at a narrow point and is provided with alternate open and plane reflecting sectors to direct the beams over the same path into the monochromator by reflection at mirror 13 near its entrance slit 14. The mirrors 3, 4, 8 and 13 are so chosen and positioned that both beams come to a sharp focus on the slit 14.

The flickering disc is rotated by the motor 73 (Fig. 5) at such a speed as to cause 60 alternations of light per second or some other suitable frequency of flickering. The aperture stops 9 and 10 in the sample and reference beams respectively are preferably so chosen that they pass to slit 14 an angle of light larger in the plane of the drawing than subsequently passes the aperture 29 in the monochromator. As a result the light diffracted out of the used beam passing stop 29, by the edge of the reflecting segments on the disc 12, is balanced by an equal amount diffracted into the used part of the beam from those parts of the beam ordinarily cut off by stop 29. The relative angles of the beams are shown in the diagram at 15. The composite beam flickering at flicker frequency is focussed through the first portion of the double monochromator by the concave mirrors 16 and 19 and the plane mirror 18 onto the middle slit 21 in the well-known manner of the Wardsworth mounting of a rock salt dispersing prism 17. Prism 17 and mirror 18 may be rotated about an axis at P to select the wave length passing through slit 21. The beam of monochromatic light at the slit 21 is bent back on itself, before entering the second portion of the double monochromator, by the concave mirror 20 which focuses the aperture stop 29 onto the grating 23. Mirror 22 makes the beam parallel before reaching the grating 23 and plane mirror 24 is mounted in the frame 51 (Fig. 5) which frame rotates about an axis at P' to select the proper part of the grating spectrum to direct by mirror 25 onto the bolometer 26. Various positions of the mirror 24 are shown in dotted lines in Fig. 1. It will be noted that by reason of its position in the framework 51 the center of the mirror 24 has been rotated about the point p' as a center. Alternatively, if a different degree of resolution is desired, the mirror 24 may be rotated 90° about an axis through its center so that the beam is directed onto the mirror 27 and thereby brought to a shorter focus onto the bolometer at 28. The first arrangement is used to give a resolution of 2000 and the second arrangement to give a resolution of 800.

The bolometer mounting (Figs. 3 and 4) consists of a slotted piece of glass 31 provided with a rock salt window 32 sealed into a bulb 35 having a side arm 36 containing metallic calcium and a sealing-off arm 37. An opaque metal film is deposited about the slot in the glass 31 to produce a slit and two heavy films of gold provide terminals for the bolometer as shown at 34. Back of the slit is mounted the bolometer 38 which is a thin strip of tellurium or germanium about 0.1 mm. by 2.5 mm. The bolometer film is stretched across an opening in a backing plate 69. The front side of the strip is blackened by evaporation of zinc black. A thickness of 0.04 micron for the strip results in a resistance of about 2 megohms and the strip is preferably heated to about 100° C. by applying 25 volts through the wires 39 which lead into the input circuit of a high gain audiofrequency amplifier shown diagrammatically at 40 in Fig. 1. If desired, a higher resistance bolometer may be produced by a thickness of 0.01 micron of tellurium on a 0.02 micron cellulose acetate support. Such a bolometer has a resistance of about 8 megohms and requires 50 volts supply. Preferably, the black coating is less than 0.01 micron thick so that no undue additional heat capacity is introduced and an immediate transfer of heat to the bolometer resistance is obtained.

The audio frequency amplification is preferably peaked at flicker frequency and the amplifier output is fed into an electric motor armature shown diagrammatically at 41 (Figs. 1 and 5), the field 71 for which is likewise supplied with current of flicker frequency. In practical operation the disc 12 has two open and two reflecting sectors and rotates on a shaft 27 which is driven by a synchronous motor at one half flicker frequency, in which case the ordinary line frequency of alternating current available may be used in the field 70 of the motor, the field being fed through the wires 76 from the same source of alternating current as the field 71 of the motor 41. The motor drives a recording device shown diagrammatically at 42 in Fig. 5 and also, through a suitable varying ratio drive such as the cam shown in detail at 43 in Fig. 7, moves the jaws 75 of the photometering aperture 10. The phase of the amplifier output is so adjusted that, as long as there is unbalance in the bolometer causing a corresponding flicker frequency component in the input of the amplifier, the motor will drive the jaws 75 of the aperture 10 in such a direction as to change the size of the aperture, and correspondingly the magnitude of the reference beam toward balance. The motor operates until the reference beam has been adjusted to the point where its content of the wave length being measured just balances that of the beam passing through the sample, at which time the flicker frequency component in the bolometer ceases and the motor stops. The operation of the amplifier and motor is substantially the same as in a visual-range spectrophotometer such as that described in my Patent No. 2,107,836 issued February 8, 1938.

While the present invention is not limited to any particular design of amplifier, motor or recording device, where an automatic record is needed, the type of device shown semi-diagrammatically in Fig. 5 may be used. A recording table 44 is moved by a suitable motor (not shown). Attached to the table is a recording sheet 45 on which the pen 46 draws a curve. Cam surfaces 47 are also attached to the table 44 and carry two cam followers 48 and 49 which move frameworks 50 and 51 about pivots P and P' respectively. Framework 50 carries the monochromator prism 17 and framework 51 the monochromator mirror 24. The cam surfaces are so chosen with respect to a wave length or frequency scale on the recording surface 45 that the horizontal position of the pen 46 on the recording surface corresponds to a setting of the monochromator to give a band of infra-red radiation of the wave length or frequency indicated on the recording surface 45.

For each position of roller 49 along its cooperating cam surface there corresponds a particular setting of the grating portion of the double monochromator at which several different orders of the grating spectrum may be used to give different wavelengths of infra-red radiation. The desired spectrum order is selected by the prism portion of the double monochromator which is driven by roller 48 cooperating with selectable cam surfaces as shown in Fig. 6. By using different gratings as well as different spectrum orders, the whole infra-red spectrum is divided into many portions for separate plotting on the recording sheet 45.

The balance motor 41 in addition to driving the cam 43 also moves the recording pen 46 along a stationary guide 52 by means of the cables 53. The cam surface 43 is so chosen with respect to the vertical scale on the recording surface 45 that the position of the pen 46 will indicate percentage opening of the aperture 10. Ordinary uniform scales may be used for the vertical scale, or special scales with corresponding special cams may be employed in order to plot curves of absorption whose shape is invariant with concentration of the color component to be measured in the sample. Such cams and scales are described for visual-range spectrophotometers in my copending application, Serial No. 158,821 filed August 12, 1937, now Patent Number 2,176,013.

The device of the present invention may be used for various purposes for which infra-red absorption measurements are necessary. Thus, it may be used to draw absorption curves through part or all of the infra-red region for particular samples. Another use is to control chemical reactions. Many chemical compounds have characteristic absorption bands in the infra-red, so that, if the product at any particular point in a chemical process be passed through the sample holder and the spectrophotometer be set for the wave length of characteristic absorption for one of the components of the process, the amount of the particular component present at that point will be measured by the movement of the pen 46 as determined by the amount of absorption. The device may be used as an indicating device or, alternatively, the drive to the pen 46 may be caused to operate through relays or other mechanically controlled devices to control the chemical process and maintain the indicating pen 46 in a position corresponding to an absorption of predetermined value which may be constant or may have a prescribed variation with time.

What I claim is:

1. An infra-red photometer comprising in combination a source of infra-red radiation, means for splitting the radiation into two beams, the first of them being used as a reference beam, means for interposing in the second beam a sample whose absorption is to be measured, means for controlling the amount of one of the beams, an infra-red monochromator having entrance and exit slits, flickering means for alternately conducting the reference beam and sample beam to the entrance slit of the monochromator, said flickering means operating at a uniform and closely controlled frequency, a high resistance bolometer consisting of a substantially continuous conducting path of an element of high specific resistance, said bolometer having a heat capacity sufficiently small to follow thermal fluctuations at flicker frequency, means for focusing the emergent beam from the exit slit of the monochromator onto said bolometer, a circuit in which said bolometer is provided with a constant direct current and is connected to the input of a thermionic amplifier capable of high amplification at flicker frequency, an electric motor driven by the output of said amplifier in interaction with alternating current of fixed phase at flicker frequency, drive means from the motor to the means for controlling the intensity of the controlled beam, the phase of the amplifier output current being adjusted with reference to said fixed phase so that the rotation of the motor will be in a direction to make the amount of the reference beam balance the sample beam.

2. An infra-red photometer comprising in combination a source of infra-red radiation, means for splitting the radiation into two beams, the first of them being used as a reference beam, means for interposing in the second beam a sample whose absorption is to be measured, means for controlling the amount of one of the beams, an infra-red monochromator having entrance and exit slits, flickering means for alternately conducting the reference beam and sample beam to the entrance slit of the monochromator, said flickering means operating at a uniform and closely controlled frequency, a high resistance bolometer consisting of a substantially continuous conducting path of tellurium, said bolometer having a heat capacity sufficiently small to follow thermal fluctuations at flicker frequency, means for focusing the emergent beam from the exit slit of the monochromator onto said bolometer, a circuit in which said bolometer is provided with a constant direct current and is connected to the input of a thermionic amplifier capable of high amplification at flicker frequency, an electric motor driven by the output of said amplifier in interaction with alternating current of fixed phase at flicker frequency, drive means from the motor to the means for controlling the intensity of the controlled beam, the phase of the amplifier output current being adjusted with reference to said fixed phase so that the rotation of the motor will be in a direction to make the amount of the reference beam balance the sample beam.

3. An infra-red photometer comprising in combination a source of infra-red radiation, means for splitting the radiation into two beams, the first of them being used as a reference beam, means for interposing in the second beam a sample whose absorption is to be measured, means for controlling the amount of one of the beams, an infra-red monochromator having entrance and exit slits, flickering means for alternately conducting the reference beam and sample beam to the entrance slit of the monochromator, said flickering means operating at a uniform and closely controlled frequency, a high resistance bolometer consisting of a substantially continuous conducting path of germanium, said bolometer having a heat capacity sufficiently small to follow thermal fluctuations at flicker frequency, means for focusing the emergent beam from the exit slit of the monochromator onto said bolometer, a circuit in which said bolometer is provided with a constant direct current and is connected to the input of a thermionic amplifier capable of high amplification at flicker frequency, an electric motor driven by the output of said amplifier in interaction with alternating current of fixed phase at flicker frequency, drive means from the motor to the means for controlling the intensity of the controlled beam, the phase of the amplifier output current being adjusted with reference to said fixed phase so that the rotation of the motor will be in a direction to make the amount of the reference beam balance the sample beam.

4. An infra-red spectrophotometer comprising in combination a source of infra-red radiation, means for splitting the radiation into two beams the first of them being used as a reference beam, means for interposing in the second beam a sample whose absorption is to be measured, means for controlling the amount of one of the beams, an infra-red monochromator having entrance and exit slits, mechanical flickering means consisting of a rotating element provided with alternate open and plane reflecting sectors so positioned that the reference and sample beams pass alternately to the entrance slit of the monochromator, said flickering means operating at a uniform and closely controlled frequency, a high resistance bolometer consisting of a substantially continuous conducting path of an element of high specific resistance, said bolometer having a heat capacity sufficiently small to follow thermal fluctuations at flicker frequency, means for focusing the emergent beam from the exit slit of the monochromator onto said bolometer, a circuit in which said bolometer is provided with a constant direct current and is connected to the input of a thermionic amplifier capable of high amplification at flicker frequency, an electric motor driven by the output of said amplifier in interaction with alternating current of fixed phase at flicker frequency, drive means from the motor to the means for controlling the intensity of the controlled beam, the phase of the amplifier output current being adjusted with reference to said fixed phase so that the rotation of the motor will be in a direction to make the amount of the reference beam balance the sample beam.

5. In a spectrophotometer according to claim 4, means for compensating the diffraction effects at the edges of the mechanical flickering device at the points of transition, comprising means for supplying to the diffracting edge a beam of larger aperture than that subsequently utilized by the monochromator whereby the diffraction into the used part of beam from the unused portion compensates for the losses from the used beam due to diffraction from the edge at the transition point.

ORRIN W. PINEO.